United States Patent

Beck et al.

Patent Number: 5,965,645
Date of Patent: *Oct. 12, 1999

[54] PLASTISOL COMPOSITION

[75] Inventors: Michael Beck, Duesseldorf; Wolfgang Ritter, Haan; Klaus Ruch, Wiesloch, all of Germany

[73] Assignee: Teroson GmbH, Heidelberg, Germany

[*] Notice: This patent issued on a continued prosecution application filed under 37 CFR 1.53(d), and is subject to the twenty year patent term provisions of 35 U.S.C. 154(a)(2).

[21] Appl. No.: 08/838,519

[22] Filed: Dec. 4, 1996

Related U.S. Application Data

[63] Continuation of application No. 08/549,746, filed as application No. PCT/EP94/01358, Apr. 29, 1994, abandoned.

[30] Foreign Application Priority Data

May 7, 1993 [DE] Germany ............................. 43 15 191

[51] Int. Cl.⁶ .................................................. C08J 39/00
[52] U.S. Cl. .......................... 524/197; 524/556; 524/562
[58] Field of Search .................................. 524/197, 556, 524/562

[56] References Cited

FOREIGN PATENT DOCUMENTS

| | | |
|---|---|---|
| 0261499 | 3/1988 | European Pat. Off. . |
| 0265371 | 4/1988 | European Pat. Off. . |
| 0333538 | 9/1989 | European Pat. Off. . |
| 0337694 | 10/1989 | European Pat. Off. . |
| 0438215 | 7/1991 | European Pat. Off. . |
| 2454235 | 5/1976 | Germany . |
| 2529732 | 1/1977 | Germany . |
| 3346350 | 6/1985 | Germany . |
| 4034725 | 5/1992 | Germany . |
| 4139382 | 6/1992 | Germany . |
| 8904817 | 1/1990 | Japan . |
| 9207906 | 5/1992 | WIPO . |

OTHER PUBLICATIONS

Paul E. Bruins, Plasticizer Technology, Weinhold Publishing Corporation, New York, vol. 1, pp. 228 to 232.

*Primary Examiner*—Peter D. Mulcahy
*Attorney, Agent, or Firm*—Ernest E. Szoke; Wayne C. Jaeschke; Real J. Grandmaison

[57] ABSTRACT

A plastisol composition containing plasticizers, fillers and styrene copolymers selected from (a) styrene, α-methyl styrene and p-methyl styrene, and (b) 3 to 20% by weight, based on the weight of the styrene copolymers, of a comonomer selected from methacrylic acid, acrylic acid and itaconic acid, and optionally (c) a crosslinking comonomer, wherein the maximum of the molecular weight distribution of said copolymers is greater than 1 million as determined by gel permeation chromatography.

24 Claims, No Drawings

PLASTISOL COMPOSITION

This application is a continuation, of application Ser. No. 08/549,746 filed on Nov. 7, 1995, now abandoned, which application is a 371 of PCT/EP94/01358 filed Apr. 29, 1994.

BACKGROUND OF THE INVENTION

1. Field of the Invention

This invention relates to a new plastisol composition based on styrene copolymers, plasticizers and inorganic fillers and, optionally, other standard additives.

Plastisols are generally understood to be dispersions of organic polymers in plasticizers which gel on heating to relatively high temperatures and harden on cooling. By far the majority of plastisols still commonly used in practice today contain finely powdered polyvinyl chloride (PVC) which is dispersed in a liquid plasticizer and forms a paste. Corresponding polyvinyl chloride plastisols are used for various applications. They are employed inter alia as sealing compounds, for example for seam sealing in metal containers or as flanged seam adhesives in the metal industry, as corrosion-inhibiting coatings for metals (for example as an underseal for motor vehicles), for impregnating and coating substrates of textile materials (for example as a coating for carpet backings), as cable insulations, etc.

Unfortunately, numerous problems are involved in the production and application of PVC plastisols. Even the production of PVC itself is not without problems because the health of personnel working in the production plants is endangered by the monomeric vinyl chloride. In addition, residues of monomeric vinyl chloride in PVC can also be a health hazard during subsequent processing or to end users although, in general, the contents are only in the ppb range.

A particularly serious problem in the application of PVC plastisols is that PVC is both heat-sensitive and light-sensitive and tends to eliminate hydrogen chloride. This is a serious problem in particular when the plastisol has to be heated to a relatively high temperature because the hydrogen chloride released under these conditions has a corrosive effect and attacks metal substrates. This applies in particular when relatively high baking temperatures are applied to shorten the gel time or when locally high temperatures occur, as in spot welding.

The biggest problem arises in the disposal of PVC-containing waste. In addition to hydrogen chloride, dioxins which are known to be highly toxic can be formed. In conjunction with steel scrap, PVC residues can lead to an increase in the chloride content of the steel melt which is also a disadvantage.

Accordingly, the problem addressed by the present invention was to provide a plastisol composition free from polyvinyl chloride which would be equivalent to PVC plastisols in its performance properties.

Polyurethane- or acrylate-based coating compositions are already known and are used instead of PVC plastisols, for example in the automotive industry. Two-component polyurethane systems differ basically from standard plastisols in terms of application; the complicated equipment required for their processing is generally not available to the user.

One-component polyurethane systems are also known but are all attended by a number of other disadvantages, namely:

Moisture-curing systems have a high viscosity and, accordingly, cannot be applied without solvents.

In the case of systems containing blocked isocyanate groups, the volatility of the blocking agent can lead to bubble formation in thick layers, in addition to which the application temperature range of 150° C. to 180° C. often cannot be adhered to for the baking conditions.

Aqueous PU dispersions do not fit into the usual production sequence on account of the evaporating water.

Microencapsulated polyurethane systems lack shear stability which leads to gelation in the pumps during application.

2. Discussion of Related Art

Although acrylate plastisols of the type known from DE-B-24 54 235 and DE-B-25 29 732 largely meet the technical requirements mentioned at the beginning, the necessary acrylate polymers are also far more expensive than polyvinyl chloride so that, hitherto, the use of such acrylate plastisols has been confined to special applications, for example as spot welding pastes, where PVC plastisols fail completely. Plastisols based on styrene/acrylonitrile copolymers according to EP-A-261 499 are not a satisfactory solution either on account of inadequate abrasion resistance and/or stability in storage.

DE-A-4 139 382 proposes plastisols based on core/shell polymers in which the core of the polymer particles is formed from a diene elastomer while the shell consists of a continuous layer of a methyl methacrylate resin, an acrylonitrile resin or a vinyl chloride polymer.

Although the first two shell materials meet the chlorine-free polymer requirement, polymer particles with a high percentage content of hard shell material are required for storable plastisols. Since these polymer particles are at least partly incompatible with the plasticizer, heterodisperse systems with which it is not possible to obtain optimal performance properties are formed after the gelation process. Although vinyl chloride polymers as a shell material reduce the percentage chlorine content in relation to pure PVC plastisols, they are not chlorine-free and, accordingly, are only an unsatisfactory partial solution to the problem.

EP-A-265 371 describes plastisols of a dispersion of carboxyfunctional fine-particle polymers reacted with polyfunctional basic substances in plasticizers. The polymers used are copolymers of any monomers with polymerizable acids, for example copolymers of vinyl chloride, vinylidene chloride, acrylates, methacrylates, maleates, styrene, methyl styrene, vinyl esters, vinyl ethers, acrylonitrile, olefins or dienes, with acids, such as acrylic acid, methacrylic acid, itaconic acid, crotonic acid, maleic acid or fumaric acid. These copolymers are reacted with basic substances, such as basic metal compounds of polyvalent metals, at least bifunctional amine compounds and others. In terms of practical application, these plastisols are unsatisfactory; their mechanical properties (elasticity or breaking elongation) are inadequate. They also show a pronounced tendency towards discoloration and form large bubbles during gelation where polyfunctional amines are added.

According to DE-A-4 034 725, plastisol compositions having excellent performance properties, more particularly high stability in storage, good adhesion to metals and high abrasion resistance, and favorable mechanical properties can be obtained by using as the organic polymer component styrene copolymer powders obtainable by emulsion polymerization which contain a) styrene and/or α-methyl styrene and/or p-methyl styrene and b) 3 to 20% by weight (based on the copolymer) of methacrylic acid and/or acrylic acid and/or itaconic acid.

In the emulsion polymerization of these styrene copolymers, polymer particles with a highly uniform average primary particle size of around 0.3 to 1.5 μm can be obtained. In these polymer particles, most of the polar carboxyl groups are externally arranged and, as lipophobic residues, are evidently responsible for the stability of the dispersions of these particles in the plasticizer at room temperature. These copolymers have a molecular weight of the order of 200,000 to 1,000,000. The plastisols produced from them overcome many of the above-described disadvantages of other chlorine-free plastisol systems, more particularly through the possibility of using reactive additives. It has now been found that the basically favorable properties of these plastisols can be significantly improved.

DESCRIPTION OF THE INVENTION

By changing the type and/or quantity of initiator system, it is possible to produce copolymers with the same composition in which at least a considerable percentage has a molecular weight well above $10^6$, at least 50% by weight of the copolymer generally having a molecular weight above $10^6$. A redox system known per se of hydrogen peroxide in conjunction with ascorbic acid or isoascorbic acid is preferably used for this purpose. However, other preferably water-soluble peroxides or inorganic per compounds may also readily be used, examples including t-butyl hydroperoxide, sodium peroxodisulfate, potassium peroxodisulfate or ammonium peroxodisulfate. Other reducing agents typically encountered in radical polymerization may also be used instead of ascorbic acid or isoascorbic acid, examples including sodium formaldehyde sulfoxylate (Rongalit®), sodium bisulfate, sugars, amines, hydroxylammonium compounds, tartaric acid or iron salts. Corresponding redox systems are also known per se in emulsion polymerization, although hydrogen peroxide is preferably used for the production of low molecular weight oligomers or polymers with molecular weights below 50,000, more particularly to produce so-called telomeric or telechelic hydroxyfunctional monomers of relatively low molecular weight or water-soluble polymers. Corresponding polymers and their production are described, for example, in EP-A-438 215 in EP-A-337 694, in DE-C-3 346 350 or in JP-A-89/4817.

The choice of the emulsifier required for the emulsion polymerization is not particularly critical. In the most simple case, sodium lauryl sulfate may be used although many anionic and/or nonionic emulsifiers are also suitable, including for example alkyl sulfates and sulfonates, aryl sulfates and sulfonates and the corresponding alkyl aryl derivatives, sulfosuccinates, (alkyl)-naphthalene sulfonates and condensates thereof with formaldehyde and also alkyl, aryl or alkyl/aryl phosphates, fatty alcohol ethoxylates, alkylphenol ethoxylates.

In exceptional cases, cationic emulsifiers may also be used. The choice of the emulsifier is determined by the required primary particle size of the polymer, the necessary stability of the aqueous polymer dispersion for subsequent processing and, in some cases, even by the required properties of the plastisol produced therefrom.

It is novel and surprising that polymers of particularly high molecular weight can be produced without special measures by using a simple redox system of hydrogen peroxide and isoascorbic acid. It is also novel and surprising that corresponding polymers should be particularly suitable for plastisol technology because it is known that polymers with molecular weights of 50,000 to 100,000 are preferably used for conventional plastisols based on polyvinyl chloride and copolymers thereof. This at least partial increase in the molecular weight of the styrene copolymers provides for the formulation of plastisols which, as expected, have higher tensile strengths. It has now surprisingly been found that these plastisols have at least equivalent and generally higher breaking elongations and, at the same time, equally good abrasion properties by comparison with the plastisols described in DE-A-4 034 725. In addition, their abrasion values can be considerably increased by simple additions known per se to the plastisol formulations so that their abrasion values can surpass those of the admittedly good PVC plastisols.

In addition to styrene, α-methyl styrene and/or p-methyl styrene, the copolymers used in accordance with the invention contain 3 to 20% by weight and preferably around 5 to 10% by weight of (meth)acrylic acid and/or itaconic acid. The stability of the plastisols in storage increases with increasing content of (meth)acrylic and/or itaconic acid. In addition, by virtue of the free carboxyl groups, the plastisols show excellent adhesion to substrates of metal (for example steel or zinc) and to cataphoretic electrocoating paints. However, the (meth)acrylic acid and/or itaconic acid content of the copolymer should be no more than 20% by weight and, preferably, no more than about 10% by weight because otherwise the abrasion resistance of the plastigel decreases. Up to 80% by weight of comonomer component b) ((meth) acrylic acid and/or itaconic acid) may be replaced by methyl (meth)acrylate, (meth)acrylamide and/or glycidyl(meth) acrylate.

In addition to the comonomer components mentioned above, other functional monomers may be copolymerized in small quantities as crosslinking comonomers. Functional monomers in the context of the invention are monomers which, in addition to the olefinically unsaturated double bond, contain a functional group which does not react during the radical polymerization to produce the copolymer, but instead is available for crosslinking reactions during gelation of the plastisol. Examples of such functional monomers apart from the glycidyl(meth)acrylate mentioned above are hydroxyethyl(meth)acrylate, hydroxypropyl(meth)acrylate, hydroxybutyl(meth)acrylate, isocyanatoethyl(meth) acrylate, 1-(1-isocyanato-1-methylethyl)-4-(1-methylethenyl)-benzene (m-TMI) and derivatives thereof containing a blocked isocyanate group or methylol(meth) acrylamide and the corresponding alkyl ethers. The reaction products of one equivalent of hydroxyethyl, hydroxypropyl or hydroxybutyl(meth)acrylate and one equivalent of a diisocyanate or polyisocyanate, the remaining isocyanate group preferably being blocked, may also be used as functional comonomers. Any of the methods known in polyurethane chemistry may be used for blocking, the type of blocking being determined by the reaction components in the plastisol and by the gelation temperature envisaged for the plastisol. For example, blocking may be carried out with oximes, caprolactam, malonic acid esters or methanol as blocking agents.

To increase the flexibility and, hence, the abrasion resistance of the plastigel produced from the plastisol composition according to the invention, the styrene component a) of the copolymer may contain up to 45% by weight and, more particularly, up to 20% by weight (based on the styrene) of butadiene, isoprene, piperylene and/or another rubber-forming comonomer.

The average primary particle size of the copolymer powder is between about 0.3 and 1.5 μm which can be achieved by corresponding control of the emulsion polymerization. The agglomerates formed from the primary particles by drying to form the powder have an average secondary particle size of less than 100 μm and preferably from about 20 to 60 μm.

In addition, it is possible in accordance with the invention further to improve properties of the plastigel, more particularly its abrasion resistance, by adding a compound which crosslinks with the carboxyl groups of the copolymer at the gelation temperature to the plastisol in a quantity of up to 40% by weight. Long-chain epoxy compounds, epoxidized polybutadienes or even epoxidized natural oils, such as epoxidized soybean oil, may be used for the reaction with the carboxyl groups present. Dihydroxyfunctional or polyhydroxyfunctional polyethylene and/or polypropylene glycols or copolymers thereof are also suitable. In addition, liquid hydroxyfunctional polybutadienes or mercaptan-terminated liquid polymers may be used instead of or in combination with the polypropylene glycols mentioned above. In general, the formation of ester bonds between these compounds and the carboxyl groups of the styrene copolymer actually takes place during heating of the plastisol to the gelation temperature. However, suitable catalysts, for example imidazole or substituted imidazoles, such as N-alkyl imidazoles, for example N-methylimidazole, tert.amines, tetramethylenediamine or urea derivatives, may optionally be added in a quantity of about 0.01 to 2.0% by weight. Alkyl benzene sulfonic acids and titanates are also suitable catalysts for esterification with glycols.

In addition, aminofunctional and/or amidofunctional compounds and/or blocked polyurethanes of the type known as coupling agents from PVC plastisol technology may be added individually or in combination to the plastisols according to the invention. Although their action mechanism is not yet fully understood, they do not produce any improvement in adhesion in the plastisols according to the invention (in general, this is already entirely adequate), but instead a considerable improvement in their abrasion resistance. Examples of such compounds are the well-known polyaminoamides based on dimerized fatty acids and low molecular weight diamines or polyamines of the type commercially known, for example, as Versamid 115, 125 or 140 and/or aminofunctional condensates of epoxides based on the bisglycidyl ether of bisphenol A with diamines or polyamines, such as for example ethylenediamine, propylenediamine, etc.

Another method of improving the mechanical properties of the plastigels is to dissolve polyurethane formers in the form of isocyanate prepolymers and low molecular weight aliphatic or cycloaliphatic diamines in the plasticizer. The isocyanate prepolymers preferably contain blocked isocyanate groups, for example caprolactam-blocked isocyanate groups, or are present in the form of solid microencapsulated isocyanate prepolymers dispersed in the liquid phase. These isocyanate prepolymers may be present in a quantity of up to 30% by weight of the formulation as a whole. In the case of low molecular weight amines (molecular weight up to about 500), the (cyclo)aliphatic diamines may contribute up to 5% by weight and, in the case of relatively high molecular weight diamines, up to 30% by weight of the formulation as a whole. On heating to the gelation temperature, polyurethane formation occurs, an IPN (interpenetrating polymer network) structure possibly being formed with the dispersed styrene copolymer.

Where one of the crosslinking comonomers described above has been incorporated in the copolymer, the plastisols according to the invention may contain further reactive additives to improve their mechanical properties. These reactive additives are determined by the crosslinking comonomer used. In the case of hydroxy-functional comonomers, diisocyanates or polyisocyanates may be added, the polyisocyanates preferably being blocked or microencapsulated. In the case of epoxy-functional comonomers, diamines or polyamines or polyaminoamides are preferably added whereas, in the case of (blocked) isocyanate-functional comonomers, aminofunctional and/or hydroxyfunctional additives may be used. These crosslinking reactions may optionally be accelerated by catalysts known per se.

The following property improvements are achieved through the reactive additives:

Thermal stability and high-temperature dimensional stability are considerably improved by crosslinking.

The soft segments of the additives provide for flexibilization and greater elasticity and for a distinct improvement in the abrasion resistance of the plastisols according to the invention after gelation.

The properties can be varied within wide limits by varying the reactive additives without numerous different styrene copolymers having to be separately produced for this purpose.

Low-temperature flexibility is significantly improved.

The plastisol composition contains around 30 to 1000 parts by weight of plasticizer to 100 parts by weight of the styrene copolymer. Basically, suitable plasticizers are the usual organic plasticizers (cf. Paul E. Bruins, Plasticizer Technology, Weinhold Publishing Corporation, New York, Vol. 1, pages 228 to 232). Alkyl phthalates, such as dibutyl phthalate, dioctyl phthalate, butyl benzyl phthalate, dibenzyl phthalate are preferred, diisononyl phthalate (DINP) being most particularly preferred. However, known plasticizers from the group of organic phosphates, adipates and sebacates or even benzyl benzoate or diphenyl ether are also suitable.

In addition to the additives mentioned thus far, the plastisols according to the invention may also contain standard additives of the type typically used in plastisol technology, including inter alia fillers such as, for example, calcium carbonate in the form of the various chalks, heavy spar, mica, vermiculite, pigments such as, for example, titanium dioxide, carbon black, iron oxides, blowing agents for the production of foamed plastisols, antiagers, flow aids such as, for example, pyrogenic silicas, Bentones, castor oil derivatives.

The styrene copolymers used in accordance with the invention are produced by emulsion polymerization, preferably by the so-called seed latex process. In this process, a seed latex is initially produced in aqueous phase using suitable emulsifiers, after which the monomers and, optionally, more emulsifier are added. In this way, the required average particle size can be adjusted relatively accurately. In addition, very narrow particle size distributions can be achieved which is highly desirable for the production of plastisols of low and reproducible paste viscosity. In addition, the hydrophilic residues, more particularly the carboxyl groups, are oriented outwards towards the aqueous phase, so that the required core/shell structure is obtained. It may even be possible first predominantly to polymerize the styrene component and only to add the comonomer in the latter stages of the polymerization. This procedure is particularly advisable when the comonomers contain relatively few polar residues, for example ester groups.

The dispersions thus obtained are then converted into a dry powder, for which purpose spray drying is particularly suitable providing the temperature conditions are selected so that the primary particles do not sinter together, but instead only form relatively loose agglomerates.

The plastisols according to the invention are suitable for use in the automotive industry, particularly as undersealing compounds and also as adhesives for hood lining materials, as sill protection compounds and as spot welding pastes and for other adhesive applications. In the packaging industry, they may be used with advantage as sealing compounds for container closures, such as crown corks, and as seam sealing compounds and flanged seam adhesives for tin cans.

In addition, these plastisols and/or the plastisols according to DE-A-4 034 725 and/or DE-A-4 139 382 may also be used for a number of other industrial applications, including inter alia coating compositions for wall coverings, floor coverings, textile coating compositions, for the protective covering of glass, for example for use in the manufacture of automobiles and other vehicles, by the process described in EP-A-B-333 538, and as an adhesive for the production of laminated safety glass.

The invention is illustrated by the following Examples.

EXAMPLE 1
Production of the Copolymer

The reaction takes place in reactor R1. The reactor is equipped with a stirrer consisting of three MIG stages. The rotational speed of the stirrer is infinitely variable. Tanks R2, R3 and R4 are used as receivers. The receivers are stirred. The tanks are heated and cooled by a mixing water battery. Temperatures of 15° C. to 70° C. can be established. All the receivers are weighed and connected to R1 by a stainless steel pipe. The contents are automatically metered by preselecting the corresponding metering rate. The reactor R1 has various heating and cooling circuits. Through two separate temperature sensors (product temperature) built into R1, the installation can be operated at temperatures of 15° C. to 120° C. To establish an inert atmosphere in R1, nitrogen can be passed over both at the head of the reactor and above the riser D1. The vacuum circuit of the installation consists of a water ring pump. For distillation, R1 is equipped with a heatable or coolable riser and a tube-bundle heat exchanger. The distillate can be returned to R1 through the distillation receivers B1 and B2.

The metering of the monomers from R2 into R1 is gravimetrically controlled. Emulsifier (R3) and initiator (R4) are metered (again gravimetrically) at a maximum distance from the flow of monomers into the reactor (R1). The excess heat of reaction is dissipated by temperature control of R1 using mixing water. The product temperature is controlled through two temperature sensors in the reactor.

The present process is a simple radical copolymerization of styrene with methacrylic acid in an aqueous emulsion with a water content of around 50%. The polymerization is initiated by the redox system hydrogen peroxide/isoascorbic acid. The monomers, the initiator system, the emulsifier and the water are continuously added at a constant metering rate to guarantee uniform growth of the polymer particles and constant release of the heat of reaction. The following components are used:

| Seed latex | Water | 48.670 kg |
|---|---|---|
| | Texapon K 12 ® | 0.018 kg |
| | Seed | 4.730 kg |
| | Isoascorbic acid | 0.120 kg |
| Monomer | Styrene | 80.190 kg |
| | Methacrylic acid | 4.500 kg |
| Emulsifier | Water | 20.500 kg |
| | Texapon K 12 ® | 0.630 kg |
| | Isoascorbic acid | 0.336 kg |
| Initiator 1 | Hydrogen peroxide (35%) | 0.115 g |

-continued

| Initiator 2 | Water | 21.150 kg |
|---|---|---|
| | Texapon K 12 ® | 0.013 kg |
| | Hydrogen peroxide (35%) | 3.080 kg |
| Initiator 3 | Hydrogen peroxide (35%) | 0.050 kg |
| Sum | | 184.102 kg |

Immediately after addition of initiator 1, the uniform introduction of initiator 2, the emulsifier and the monomers is commenced. The internal temperature is adjusted to 83° C. After four hours, the addition is terminated.

On completion of the addition phase, the mixture is kept at 80° C. for another three hours (post-polymerization phase to reduce the residual monomer content). One hour after the end of the monomer addition, initiator 3 is introduced into the reactor.

On completion of the reaction, the dispersion is cooled ($\leq 45°$ C.) and drained off through a filter bag.

To obtain a polymer powder suitable for plastisol production, the dispersion is spray-dried, the particular parameters selected being dependent upon the installation used. The following conditions were applied:

Air inlet temperature: 190–200° C.

Air outlet temperature: 95–100° C.

Agglomerate particle size of the dried powder: 35±5 $\mu$m.

The molecular weight of the polymer powder thus obtained was determined by gel permeation chromatography (GPC), column combination:

$10^6$, $10^5$, $10^4$, $10^3$, 500 Å Ultrastyragel,

Solvent: tetrahydrofuran, 1.0 ml/min.

Calibration: polystyrene standards

Weight average molecular weight ($M_W$): $1.0 \cdot 10^6$

Molecular weight distribution peak: $2.4 \cdot 10^6$.

The molecular weight distribution peak is understood to be the maximum of the GPC molecular weight distribution curve.

EXAMPLE 2
Comparison Example for the Production of a Copolymer

The procedure was as in Example 1 except that a total of 0.556 kg of isoascorbic acid was used.

The polymer dispersion was worked up in the same way as in Example 1.

Molecular weight determination: $M_W$=310,000

Molecular weight distribution peak: 150,000

EXAMPLE 3
Plastisol Composition According to the Invention

| Polymer powder according to Example 1 | 35.0 parts |
|---|---|
| DINP | 36.0 parts |
| Chalk | 11.2 parts |
| Barium sulfate | 5.0 parts |
| Calcium oxide | 1.0 part |
| Aerosil 200 ® | 0.3 part |
| Diluent | 1.5 parts |
| Versamid 140 ® | 1.0 part |
| PU prepolymer | 4.0 parts |
| Amine adduct | 1.0 part |
| Dicyclohexyl phthalate | 5.0 parts |
| Baking time | 25 mins. |
| Baking temperature | 160° C. |
| Layer thickness | 1000 $\mu$m, |
| Abrasion time | 11 mins. 53 secs. |

EXAMPLE 4
Plastisol Composition According to the Invention

| | |
|---|---|
| Polymer powder according to Example 1 | 30.0 parts |
| DINP | 36.0 parts |
| Chalk | 16.2 parts |
| Barium sulfate | 5.0 parts |
| Calcium oxide | 1.0 part |
| Aerosil 200 ® | 0.3 part |
| Diluent | 1.5 parts |
| Versamid 140 ® | 1.0 part |
| PU prepolymer | 4.0 parts |
| Amine adduct | 1.0 part |
| Dicyclohexyl phthalate | 5.0 parts |
| Baking time | 25 mins. |
| Baking temperature | 160° C. |
| Layer thickness | 1000 μm, |
| Abrasion time | 14 mins. 30 secs. |

Comparision Example 1
From P 40 34 725.7

| | |
|---|---|
| Polymer powder | 100.0 parts |
| DINP | 100.0 parts |
| Baking time | 30 mins. |
| Baking temperature | 150° C. |
| Layer thickness | 1000 μm, |
| Abrasion time | 44 secs. |

Comparision Example 2
From P 40 34 725.7

| | |
|---|---|
| Polymer powder | 200.0 parts |
| DINP | 200.0 parts |
| Polyurethane | 100.0 parts |
| Diamine | 10.0 parts |
| Chalk | 200.0 parts |
| Calcium oxide | 40.0 parts |
| Baking time | 25 mins. |
| Baking temperature | 160° C. |
| Layer thickness | 1000 μm, |
| Abrasion time | 9 mins. 50 secs. |

Comparision Example 3

| | |
|---|---|
| Polymer powder according to Example 2 | 35.0 parts |
| DINP | 36.0 parts |
| Chalk | 11.2 parts |
| Barium sulfate | 5.0 parts |
| Calcium oxide | 1.0 part |
| Aerosil 200 ® | 0.3 part |
| Diluent | 1.5 parts |
| Versamid 140 ® | 1.0 part |
| PU prepolymer | 4.0 parts |
| Amine adduct | 1.0 part |
| Dicyclohexyl phthalate | 5.0 parts |
| Baking time | 25 mins. |
| Baking temperature | 160° C. |
| Layer thickness | 1000 μm, |
| Abrasion time | 1 min. 53 secs. |

Comments on Examples 1 and Comparison Examples 1 to 3.

| | |
|---|---|
| Texapon K 12 ® : | Sodium lauryl sulfate (Henkel KGaA) |
| Versamid 140 ® : | Polyaminoamide based on dimeric linoleic acid/ethylenediamine (Schering) |
| Aerosil 200 ® : | Highly disperse silica (Degussa AG) |
| PU prepolymer: | Caprolactam-blocked prepolymer based on diphenyl methane diisocyanate and OH-functional adipic acid ester, molecular weight about 4,000. |
| Amine adduct: | Aminofunctional condensation product of an epoxide based on the diglycidyl ether of bisphenol A and ethylenediamine, molecular weight about 800. |

The abrasion value was determined by the "Sablux" method by bombardment with steel scrap at an angle of 30° and under a pressure of about 4 bar.

Comparison of the Examples according to the invention with the Comparison Examples clearly shows that the plastisols based on the high molecular weight copolymer according to the invention are distinctly superior both to those of low molecular weight (Comparison Example 3) and to those of the prior art (Comparison Examples 1 and 2).

We claim:

1. A plastisol composition free of polyvinyl chloride comprising plasticizers, fillers and (a) copolymers of styrene selected from styrene, α-methyl styrene and p-methyl styrene, and (b) 3 to 20% by weight, based on the weight of said copolymers of styrene, of a comonomer selected from the group consisting of methacrylic acid, acrylic acid and itaconic acid, and (c) an initiator system for producing said copolymers of styrene selected from the group consisting of hydrogen peroxide and ascorbic acid, hydrogen peroxide and isoascorbic acid, sodium peroxodisulfate and ascorbic acid or isoascorbic acid, potassium peroxodisulfate and ascorbic acid or isoascorbic acid, ammonium peroxodisulfate and ascorbic acid or isoascorbic acid, hydrogen peroxide and sodium formaldehyde sulfoxylate, hydrogen peroxide and sodium bisulfate and mixtures thereof, wherein at least 50% by weight of the molecular weight distribution peak of said copolymers is greater than 1 million as determined by gel permeation chromatography.

2. A plastisol composition as in claim 1 wherein the styrene component of said copolymers contains up to 45% by weight, based on the weight of said styrene component of butadiene, isoprene, or piperylene.

3. A plastisol composition as in claim 1 wherein part of the comonomer component (b) is replaced by methyl(meth)methacrylate or (meth)acrylamide.

4. A plastisol composition as in claim 1 wherein said comonomer component (b) is present in said copolymers of styrene in an amount of from 5 to 10% by weight, based on the weight of said copolymers of styrene.

5. A plastisol composition as in claim 1 wherein said copolymers of styrene are present in the form of a powder having an average primary particle size of 0.3 to 1.5 μm and an average secondary particle size of less than 100 μm.

6. A plastisol composition as in claim 1 wherein said copolymers of styrene have a core/shell structure and wherein the shell is made up of polar groups.

7. A plastisol composition as in claim 1 wherein said copolymers of styrene contain a crosslinking comonomer.

8. A plastisol composition as in claim 7 wherein said crosslinking comonomer is present in an amount of 0.5 to 10% by weight, based on the weight of said styrene copolymers.

9. A plastisol composition as in claim 1 wherein the initiator system is hydrogen peroxide and isoascorbic acid.

10. A plastisol composition as in claim 1 additionally containing a compound which enters into a crosslinking reaction with said copolymers of styrene at their gelation temperature.

11. A plastisol composition as in claim 10 wherein said compound which enters into a crosslinking reaction is selected from the group consisting of long-chain epoxy compounds, epoxidized polybutadienes, dihydroxyfunctional and polyhydroxyfunctional polyethylene, polypropylene glycols and copolymers thereof, and hydroxyfunctional polybutadienes.

12. A plastisol composition as in claim 10 additionally containing at least one compound which enters into a crosslinking reaction with said compound which enters into a crosslinking reaction at the gelation temperature of said plastisol.

13. A plastisol composition as in claim 7 additionally containing a catalyst for said crosslinking comonomer.

14. A plastisol composition as in claim 13 wherein said catalyst is selected from the group consisting of substituted imidazoles, tertiary amines, tetramethylenediamine, urea derivatives, alkyl benzene sulfonic acids, titanates and organotin compounds.

15. A plastisol composition as in claim 7 wherein said crosslinking comonomer comprises a functional monomer which contains an olefinically unsaturated double bond and an epoxy group, an isocyanate group, a blocked isocyanate group or a hydroxyl group as an additional functional group and said plastisol composition contains diamines or polyamines, diaminoamides or polyaminoamides, dicarboxylic or polycarboxylic acids, dimercapto or polymercapto compounds or diisocyanates or polyisocyanates, in blocked or microencapsulated form, as compounds crosslinking with the additional functional groups.

16. A plastisol composition as in claim 1 additionally containing in said plasticizers a small quantity of polyurethane formers in the form of isocyanate prepolymers and (cyclo)aliphatic diamines which react to form a polyurethane at the gelation temperature in relation to said styrene copolymers.

17. A plastisol composition as in claim 16 containing isocyanates having blocked isocyanate groups.

18. A plastisol composition as in claim 15 containing an isocyanate prepolymer in a quantity of up to 30% by weight based on the weight of said plastisol and (cyclo)aliphatic diamines in a quantity of up to 5% by weight in the case of low molecular weight amines and in a quantity of up to 30% by weight of said plastisol in the case of relatively high molecular weight diamines.

19. A plastisol composition as in claim 1 containing up to 700 parts inert fillers and other additives to 100 parts by weight of said styrene copolymers.

20. The process of improving the properties of a plastisol applied to a substrate comprising applying to said substrate a plastisol composition free of polyvinyl chloride comprising plasticizers, fillers and (a) copolymers of styrene selected from styrene, α-methyl styrene and p-methyl styrene, and (b) 3 to 20% by weight based on the weight of said copolymers of styrene, of a comonomer selected from the group consisting of methacrylic acid, acrylic acid and itaconic acid, and (c) an initiator system for producing said copolymers of styrene selected from the group consisting of hydrogen peroxide and ascorbic acid, hydrogen peroxide and isoascorbic acid, sodium peroxodisulfate and ascorbic acid or isoascorbic acid, potassium peroxodisulfate and ascorbic acid or isoascorbic acid, ammonium peroxodisulfate and ascorbic acid or isoascorbic acid, hydrogen peroxide and sodium formaldehyde sulfoxylate, hydrogen peroxide and sodium bisulfate and mixtures thereof, wherein at least 50% by weight of the molecular weight distribution peak of said copolymers is greater than 1 million as determined by gel permeation chromatography.

21. A process as in claim 20 wherein said substrate comprises an automotive component and said plastisol composition is applied thereto as an undersealing compound, as an adhesive, as a sill protecant, or as a spot welding paste.

22. A process as in claim 20 wherein said substrate comprises a container and said plastisol composition is applied thereto as a sealant.

23. A process as in claim 20 wherein said substrate comprises a covering selected from a textile, a wall covering and a floor covering.

24. A process as in claim 20 wherein said substrate comprises a glass surface.

* * * * *